Jan. 20, 1925.
C. A. BORNMANN
AUTOMATIC FILM WINDING CAMERA
Filed Oct. 16, 1924
1,523,577
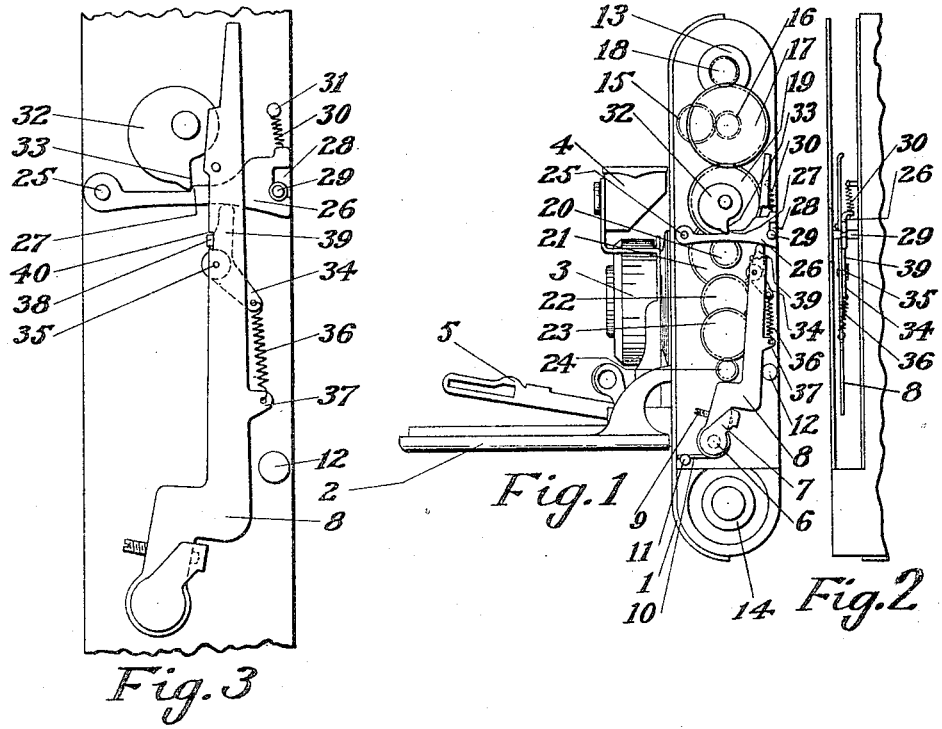
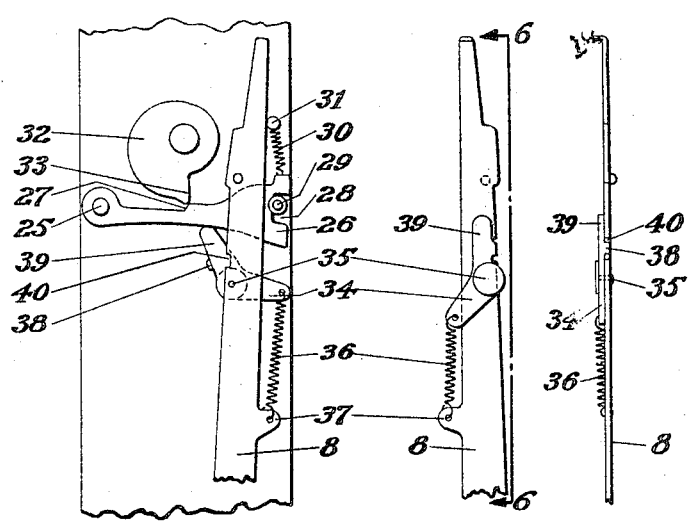
INVENTOR
CARL A BORNMANN
BY
ATTORNEY Patented Jan. 20, 1925.

1,523,577

UNITED STATES PATENT OFFICE.

CARL A. BORNMANN, OF BINGHAMTON, NEW YORK, ASSIGNOR TO ANSCO PHOTO-PRODUCTS, INC., OF BINGHAMTON, NEW YORK.

AUTOMATIC FILM-WINDING CAMERA.

Application filed October 16, 1924. Serial No. 744,004.

*To all whom it may concern:*

Be it known that I, CARL A. BORNMANN, a citizen of the United States, and a resident of the city of Binghamton, county of Broome and State of New York, have invented certain new and useful Improvements in an Automatic Film-Winding Camera, of which the following is a description, reference being had to the accompanying drawing, which forms a part of this specification.

This invention relates generally to cameras and is particularly directed to that type of camera using roll film, and which is provided with means for automatically winding an unexposed section of film into position for exposure, subsequent to the operation of the shutter.

One object of my invention is to provide an improved releasing device for the automatic mechanism.

A second object is to provide such a releasing device which is simple in construction, positive in operation and which requires little or no adjustment in assembling.

A further object is to provide a releasing device which not only functions as such, but which in addition provides a safety catch or element which eliminates the possibility of the winding mechanism being accidently set off, due to dropping or jarring the camera accidently.

Another object accomplished by my new releasing device is the utilization of the tension of the motor or power device which drives the automatic mechanism, to permit operation of the same in co-operating with the releasing device.

A further object is to simplify greatly the mechanism of a camera of this type, by way of reducing the number of parts necessary to proper operation, and thereby cutting the cost in labor and material in manufacture.

A still further object contemplates the provision of a releasing device which requires a minimum of effort and strength to operate.

My invention is an improvement upon that patented in and by the United States Letters Patents #1,197,901, dated Sept. 12, 1916, #1,216,543, dated Sept. 20, 1917, #1,268,805, dated June 4, 1918, #1,503,300, dated July 29, 1924, and #1,513,268 dated Oct. 28, 1924, all issued to Ansco Photoproducts, Inc., as the assignor of Carl Bornmann, Ezra C. Clark, George W. Topliff, John F. Polhemus and J. P. Pawley. Other objects and advantages in detail of construction and operation will be apparent as the description proceeds, reference being had to the accompanying drawing wherein like reference numerals indicate like parts.

In the drawings:

Fig. 1 is a side view of my improved camera, the cap and cover plates being removed therefrom to show the assembled elements, parts of which are illustrated in outline only.

Fig. 2 is a detailed edge view of my improved mechanism, parts thereof being omitted for clearness in illustration.

Fig. 3 is a detailed side view of my new releasing device, the parts being shown in the position assumed upon the initial operation thereof.

Fig. 4 illustrates the parts shown in Fig. 3 in the position assumed just as the releasing operation is completed.

Fig. 5 is a detail view of the releasing device taken from the side opposite that shown in Fig. 3.

Fig. 6 is taken on the line 6—6 of Fig. 5.

A camera of the automatic film winding type is indicated generally by the reference numeral 1, and as shown in Fig. 1 is provided with the usual platform, 2, shutter 3 and view finder 4. The lever 5 is the means whereby the shutter mechanism is connected with the automatic winding mechanism when the camera is open and ready for operation. The exact construction and operation of this lever is clearly and fully described in the afore mentioned Patent, No. 1,268,805. As this lever forms no part of the present invention, further reference need not be made thereto, except by way of explanation it may be said that when the shutter 3 of the camera is pulled outwardly on the platform 2, to picture taking position, it assumes a position of co-operation with the lever 5, with the result that when the shutter is operated in the usual manner lever 5 is pressed downwardly and then permitted to return to the position shown. The inner end of the lever 5 is secured to a shaft 6 running transversely through the camera, and having at its opposite end the arm 7 as shown in Fig.

1. The free end of this arm engages an operating lever 8 through the means of the adjusting screw 9, and a coil spring 10 having one end anchored at 11 normally tends to throw the operating lever 8 into the position shown in Fig. 1 against the stop pin 12. It will be understood therefore that upon the aforementioned downward stroke of the lever 5, during which the shutter is snapped, the operating lever 8 will be rocked on its pivot against the tension of the spring 10 to the left as in Fig. 1.

Upon the upward or return movement of the lever 5, after the shutter has been snapped, the coil spring 10 acts to return the lever 8 to its normal position shown in Fig. 1. For a more detailed description of the construction and operation of the parts just described, reference should be made to the above mentioned Patent No. 1,268,805.

Applicant has shown in more or less diagrammatic or outline form the driving mechanism for rotating the take up spool 13 for winding the film thereon from the supply spool 14. This driving mechanism likewise forms no part of this invention and for a detailed description of the operation thereof, reference is again made to Patent No. 1,268,805. Suffice it to say here that by means of a spring motor or other power device (not shown) the pinion 15 is rotated, and meshing with pinion 16 rotates the gear 17 mounted upon the same shaft therewith. The gear 17 drives pinion 18, which in turn rotates the take up spool 13, thus drawing the film from the supply spool 14. The gears 19—20—21—22 and 23 form a train, the function of which is to drive a centrifugal governor indicated generally at 24 whereby the speed of the winding mechanism is controlled.

Pivoted at 25 is a stop lever 26 provided intermediate its ends with a bevelled shoulder 27. This lever is guided in its movement by means of a notch 28 in its free end in which engages the guide pin 29. A coil spring 30, anchored at one end as at 31, is secured to the free end of the lever 26 and normally holds the lever at the upward limit of its movement in the position shown in Figs. 1 and 3. A stop lug 32 is rigidly mounted on gear 19 to rotate therewith. A shouldered point 33 is provided on this lug for engagement with the shoulder 27 of the lever 26.

From the foregoing it would be readily understood that with the stop lever 26 in its upper normal position the shoulder 27 will lie in the path of the stop lug 32. It will also be obvious that to permit operation of the winding mechanism the lever 26 must be rocked downwardly on its pivot, permitting disengagement with the lug 32, so that said lug together with the entire gear train will be permitted to rotate under the influence of the motor driven pinion 15.

Due to the extraordinary power required to drive this mechanism there is a great stress placed upon the holding point consisting of the two shoulders, 27 and 33. This stress is far greater than the strength of the spring 30 and, assisted further by the slight bevel on the shoulder 27 shown clearly in Figs. 1-3 and 4, such stress easily forces the lever 26 downwardly against the tension of the spring 30 thus releasing the winding mechanism, except for the part about to be described.

Carried pivotally on the underside of the operating lever 8 is my improved releasing lever 34. This member is pivoted centrally at 35 and is in the form of a bell crank, to one end of which is secured a spring 36 anchored to the ear 37 on the lever 8. A lug is carried by the other arm 39 of the bell crank and is bent at right angles for engagement with one edge of the operating lever 8. A recess 40 has been provided in said edge to receive the stop lug 38. A spring 36 functions to normally hold the lug 38 in engagement with lever 8, and in such position the free end 39 of the bell crank is held in alignment with the lever 8 and in contact with the lower edge of the stop lever 26. With the parts in this position it will be apparent that the stop lever 26 will be held upwardly in engagement with the stop lug 32, thus preventing the winding mechanism from operating.

When the operating lever 8 is moved to the left in Fig. 1 on the downward movement of the lever 5 as before explained, the bell crank will be carried therewith and due to its engagement with the lever 8 will maintain its alignment therewith and therefore still function as a holding means for the stop lever 26. The parts are shown in such position in Fig. 3. Upon the return movement to the right of the operating lever 8 under the influence of its spring 10, the frictional engagement of the end 39 of the bell crank releasing device will cause said bell crank to remain in the position to which it has been carried, as shown clearly in Fig. 4, and in such position, with the operating lever 8 out of alignment therewith, the stress or tendency to rotate in the stop lug 32 is sufficient with the aid of the bevel shoulder 27, to overcome the tension of both the springs 30 and 36 and force the lever 26 downward permitting the stop lug to pass by the shoulder 27 whereupon the winding mechanism is free to operate one full revolution of the gear 19. This is sufficient to permit a fresh exposure of film to be wound into position in the camera.

Immediately upon the passing of shoulder 33 on the stop lug 32 by the shoulder 26, spring 30 pulls the lever 26 upwardly into its normal position again in the path of the shoulder 33 when it has completed its revolution. With the return of the lever 26 to its normal position, spring 36 immediately pulls the arm 39 of the releasing device to its normal position in alignment with the lever 8 thus again forming a positive lock for the stop lever 26.

As the operation of my improved camera will be apparent from the foregoing description, the same will not be repeated. It will be obvious to those skilled in the art that I have provided a releasing device extremely simple in construction and operation and which requires a minimum number of parts to provide for the efficient and positive function necessary to a device of this character.

By this arrangement I have utilized the power or stress imparted to the gear train by the driving pinion of the motor to release the winding mechanism, instead of relying upon the operating lever 8 and its spring 10 to do this work. Further my improved releasing device serves the additional purpose of forming a safety lock for the stop lever 26 which prevents accidental releasing of the mechanism at the wrong time through jarring the camera, etc.

The form of my invention as herein shown and described, is the preferred embodiment thereof, but it is to be understood that many changes and variations in details of construction and operation are possible and I do not therefore limit myself to the specific structure shown other than by the appended claims.

I claim:

1. A releasing device for a camera winding mechanism comprising a driven element, a yieldable stop element normally in the path of movement of said driven element, an operating lever, means carried thereby frictionally engaging said stop element whereby upon a predetermined movement of said lever said stop element will yield permitting the release of said driven element.

2. A releasing device for a camera winding mechanism comprising a driven element, a yieldable stop element normally in the path of movement of said driven element, an operating lever, means carried thereby and normally in alignment therewith, frictionally engaging said stop element, said frictional engagement acting to hold said means out of alignment with said lever upon a predetermined movement thereof, whereby said stop element will yield permitting the release of said driven element.

3. A releasing device for a camera winding mechanism comprising a driven element normally under tension to drive the winding mechanism and to force aside a yieldable stop element normally in the path thereof, an operating lever, and means carried thereby, having frictional engagement with said stop element, for releasing stop element to the action of said driven element.

4. A releasing device for a camera winding mechanism comprising a driven element normally under tension to drive the winding mechanism and to force aside a yieldable stop element normally in the path thereof, an operating lever, and a pivoted releasing lever carried thereby having frictional engagement with said stop element.

5. A releasing device for a camera winding mechanism comprising a driven element normally under tension to drive the winding mechanism and to force aside a yieldable stop normally in the path thereof, an operating lever, and a pivoted releasing lever carried thereby and normally in alignment therewith having frictional engagement with said stop element.

6. A releasing device for a camera winding mechanism comprising a driven element normally under tension to drive the winding mechanism and to force aside a yieldable stop element having a bevelled shoulder normally in the path of a lug carried by said driven element, an operating lever, and a pivoted releasing lever carried thereby and normally held in alignment therewith having frictional engagement with said stop element.

7. A releasing device for a camera winding mechanism comprising a driven element normally under tension to drive the winding mechanism and to force aside a yieldable stop element normally in the path thereof, an operating lever, a pivoted releasing lever carried thereby and normally in alignment, one end of said releasing lever having frictional engagement with said stop element, and means whereby upon movement of said operating lever in one direction, said releasing lever is carried therewith, but upon the return movement said frictional engagement holds said releasing lever from alignment with said operating lever, permitting the stop element to yield.

CARL A. BORNMANN.